US012752341B2

(12) United States Patent
Herschke et al.

(10) Patent No.: US 12,752,341 B2
(45) Date of Patent: Oct. 6, 2026

(54) THREE-DIMENSIONAL PRINTING WITH POLYOLEFIN AND METAL OR METAL OXIDE BUILD MATERIALS

(71) Applicant: PERIDOT PRINT LLC, Palo Alto, CA (US)

(72) Inventors: Laurent Herschke, Sant Cugat del Valles (ES); Maria del Carmen Querol Esparch, Sant Cugat del Valles (ES); Jerome Gimenez, Bron (FR); Florian Deme, Bourgoin Jallieu (FR)

(73) Assignee: Peridot Print LLC, Palo Alto, CA (US)

( * ) Notice: Subject to any disclaimer, the term of this patent is extended or adjusted under 35 U.S.C. 154(b) by 578 days.

(21) Appl. No.: 18/021,754

(22) PCT Filed: Jun. 17, 2021

(86) PCT No.: PCT/US2021/037934
§ 371 (c)(1),
(2) Date: Feb. 16, 2023

(87) PCT Pub. No.: WO2022/046249
PCT Pub. Date: Mar. 3, 2022

(65) Prior Publication Data

US 2023/0321724 A1 Oct. 12, 2023

(30) Foreign Application Priority Data

Aug. 31, 2020 (EP) .................................... 20315395

(51) Int. Cl.
*B29C 64/165* (2017.01)
*B22F 10/14* (2021.01)
(Continued)

(52) U.S. Cl.
CPC .............. *B22F 10/14* (2021.01); *B22F 10/30* (2021.01); *B29C 64/165* (2017.08);
(Continued)

(58) Field of Classification Search
CPC .................................................... B29C 64/165
See application file for complete search history.

(56) References Cited

U.S. PATENT DOCUMENTS

2018/0043617 A1 2/2018 Sugiyama et al.
2018/0162048 A1 6/2018 Gibson et al.
(Continued)

FOREIGN PATENT DOCUMENTS

CA 3073670 A1 8/2020
CN 103980608 B 7/2015
(Continued)

*Primary Examiner* — Christopher S Kessler
(74) *Attorney, Agent, or Firm* — Dierker & Kavanaugh, P.C.

(57) ABSTRACT

The present disclosure describes methods and systems for making three-dimensional printed objects. In one example, a method of making a three-dimensional printed object can include iteratively applying individual particulate build material layers to a powder bed. The particulate build material can include polymer particles that include a polyolefin and first nanoparticles compounded nanoparticles compounded with the polyolefin such that the first nanoparticles are embedded nanoparticles are embedded within the polymer particles. Second nanoparticles can be dry blended with the polymer particles. The first nanoparticles and second nanoparticles can include metal or metal oxide. The first and second nanoparticles can have a higher thermal conductivity that the polyolefin. A fusing agent including water and an electromagnetic radiation absorber can be selectively jetted onto the individual particulate build material layers. The powder bed can be exposed to energy to
(Continued)

selective-fuse the polymer particles in contact with the electromagnetic radiation absorber.

12 Claims, 4 Drawing Sheets

(51) Int. Cl.

| | |
|---|---|
| ***B22F 10/30*** | (2021.01) |
| ***B29C 64/393*** | (2017.01) |
| ***B33Y 10/00*** | (2015.01) |
| ***B33Y 30/00*** | (2015.01) |
| ***B33Y 50/02*** | (2015.01) |
| ***B33Y 70/10*** | (2020.01) |

(52) U.S. Cl.
CPC ............ *B29C 64/393* (2017.08); *B33Y 10/00* (2014.12); *B33Y 30/00* (2014.12); *B33Y 50/02* (2014.12); *B33Y 70/10* (2020.01)

(56) References Cited

U.S. PATENT DOCUMENTS

| | | | | |
|---|---|---|---|---|
| 2018/0244862 | A1 | 8/2018 | Price | |
| 2018/0272607 | A1 | 9/2018 | Chaffins et al. | |
| 2019/0022930 | A1* | 1/2019 | Hinch | B33Y 70/00 |
| 2021/0070993 | A1* | 3/2021 | Farrugia | C08L 23/12 |
| 2022/0127477 | A1* | 4/2022 | Wycoff | B33Y 70/00 |

FOREIGN PATENT DOCUMENTS

| | | | | |
|---|---|---|---|---|
| CN | 108602262 | A | 9/2018 | |
| CN | 105753138 | B | 4/2019 | |
| KR | 10-1199783 | B1 | 11/2012 | |
| WO | 2017/180095 | A1 | 10/2017 | |
| WO | WO-2019221733 | A1 * | 11/2019 | C08L 53/00 |
| WO | 2020/081066 | A1 | 4/2020 | |

* cited by examiner

THREE-DIMENSIONAL PRINTING WITH POLYOLEFIN AND METAL OR METAL OXIDE BUILD MATERIALS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, dimensional accuracy, visual appearance, durability and so on. Nevertheless, several commercial sectors such as aviation and the medical industry have benefitted from the ability to rapidly prototype and customize parts for customers.

DETAILED DESCRIPTION

Figure 1:
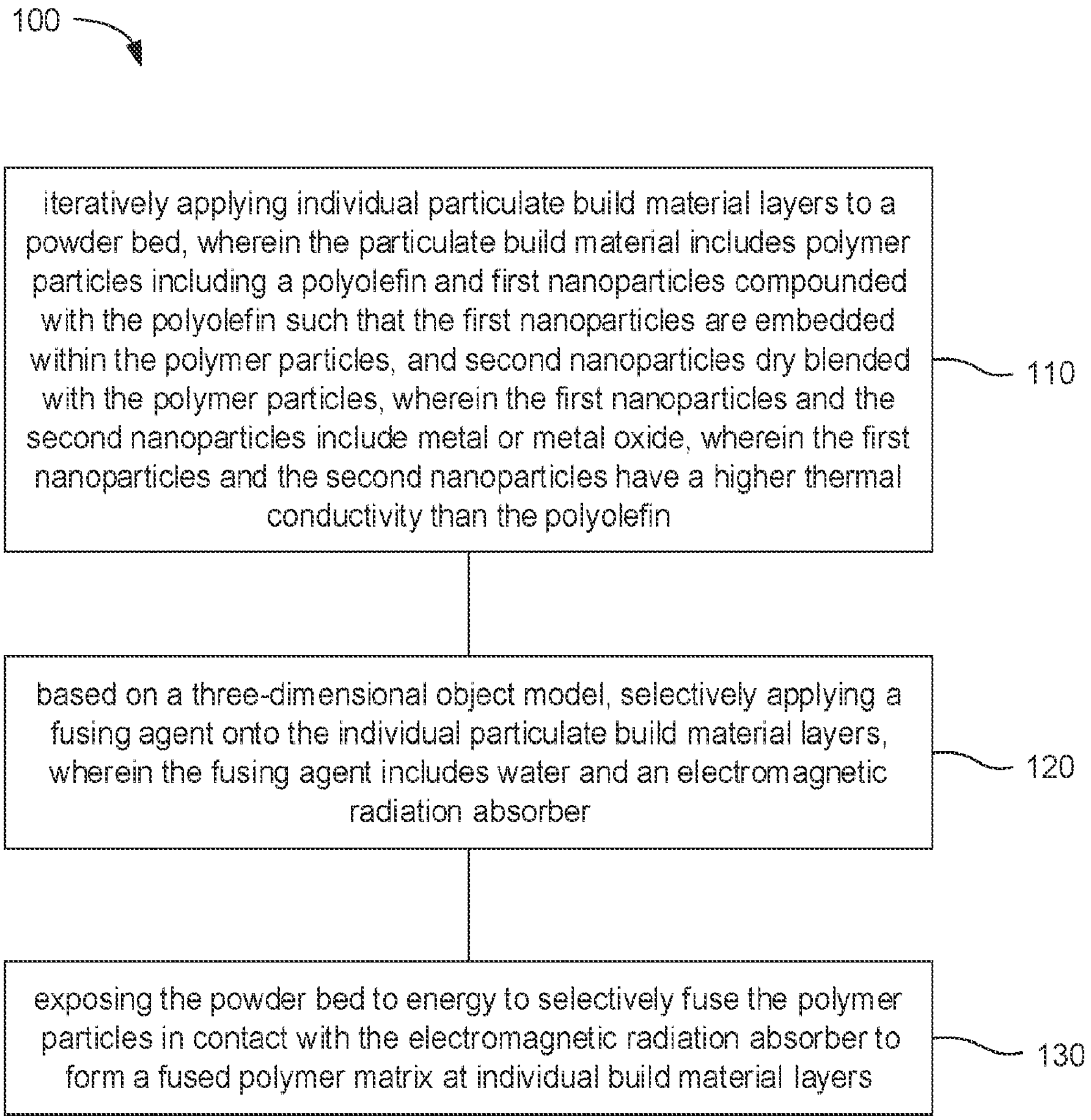
FIG. 1 is a flowchart illustrating an example method of making a three-dimensional printed object in accordance with examples of the present disclosure.

The present disclosure describes methods and systems for making three-dimensional printed objects using particulate build materials based on polyolefins and metal or metal oxide nanoparticles. In one example, a method of making a three-dimensional printed object includes iteratively applying individual particulate build material layers to a powder bed. The particulate build material includes polymer particles that include a polyolefin and first nanoparticles compounded with the polyolefin such that the first nanoparticles are embedded within the polymer particles. The particulate build material also includes second nanoparticles dry blended with the polymer particles. The first nanoparticles and second nanoparticles include metal or metal oxide. The first nanoparticles and the second nanoparticles have a higher thermal conductivity than the polyolefin. This method also includes selectively applying a fusing agent onto the individual particulate build material layers, based on a three-dimensional object model. The fusing agent includes water and an electromagnetic radiation absorber. The powder bed is exposed to energy to selectively fuse the polymer particles in contact with the electromagnetic radiation absorber to form a fused polymer matrix at individual build material layers. In some examples, the first nanoparticles can be included in the polymer particles at a concentration from about 0.25 wt % to about 5 wt % with respect to the total weight of the polymer particles. In further examples, the second nanoparticles can be included in the particulate build material at a concentration from about 0.05 wt % to about 0.5 wt % with respect to the total weight of the particulate build material. In other examples, the polyolefin can include polyethylene, polypropylene, polybutene-1, polymethylpentene, polyoctene, polyisoprene, polybutadiene, or a copolymer thereof. In still further examples, the first nanoparticles and the second nanoparticles can independently include aluminum oxide, zinc oxide, silicon dioxide, copper oxide, titanium dioxide, silver, or a combination thereof. In certain examples, the first nanoparticles and the second nanoparticles can be the same compound. In some examples, the polymer particles can have an average particle size from about 10 µm to about 140 µm and the first nanoparticles can have an average particle size from about 7 nm to about 500 nm. In further examples, the radiation absorber can include carbon black, a near-infrared absorbing dye, a near-infrared absorbing pigment, a tungsten bronze, a molybdenum bronze, metal nanoparticles, a metal dithiolene complex, a conjugated polymer, or a combination thereof. In still further examples, the method can also include selectively applying a detailing agent onto an area of the individual particulate build material layers to reduce a temperature of the particulate build material onto which the detailing agent is jetted.

In another particular example, a method of printing a three-dimensional printed object using a three-dimensional printing system includes using a hardware controller of the three-dimensional printing system to generate a command to direct a build material applicator of the three-dimensional printing system to apply a particulate build material layer to a powder bed of the three-dimensional printing system. The particulate build material includes polymer particles that include a polyolefin and first nanoparticles compounded with the polyolefin such that the first nanoparticles are embedded within the polymer particles. The particulate build material also includes second nanoparticles dry blended with the polymer particles. The first nanoparticles and second nanoparticles include metal or metal oxide. The first nanoparticles and the second nanoparticles have a higher thermal conductivity than the polyolefin. The hardware controller is also used to generate a command to direct a fusing agent applicator of the three-dimensional printing system to selectively apply a fusing agent to the layer of the particulate build material, based on a three-dimensional object model. The fusing agent includes water and an electromagnetic radiation absorber, wherein the electromagnetic radiation absorber absorbs radiation and converts the radiation energy to heat. The hardware controller is also used to generate a command to direct a radiant energy source of the three-dimensional printing system to expose the layer of powder bed material to radiation energy to selectively fuse the particulate build material in contact with the electromagnetic radiation absorber and thereby form a three-dimensional printed object. In some examples, the first nanoparticles can be included in the polymer particles at a concentration from about 0.10 wt % to about 5 wt % with respect to the total weight of the polymer particles, and the second nanoparticles can be included in the particulate build material at a concentration from about 0.05 wt % to about 0.5 wt % with respect to the total weight of the particulate build material, and the polyolefin can include polyethylene, polypropylene, polybutene-1, polymethylpentene, polyoctene, polyisoprene, polybutadiene or a copolymer thereof, and the first nanoparticles and the second nanoparticles can independently include aluminum oxide, zinc oxide, silicon dioxide, copper oxide, titanium dioxide, silver, or a combination thereof. In another example, the method can also include using the hardware controller to generate a command to direct a detailing agent applicator of the three-dimensional printing system to apply a detailing agent to the layer of particulate build material to cool the particulate build material.

In another specific example of the present disclosure, a three-dimensional printing system includes a particulate build material and a fusing agent applicator. The particulate build material includes polymer particles including a polyolefin and first nanoparticles compounded with the polyolefin such that the first nanoparticles are embedded within the polymer particles. The particulate build material also includes second nanoparticles dry blended with the polymer particles. The first nanoparticles and second nanoparticles can include metal or metal oxide. The first nanoparticles and the second nanoparticles have a higher thermal conductivity than the polyolefin. The fusing agent applicator is fluidly coupled or coupleable to a fusing agent, and the fusing agent applicator is directable to iteratively apply the fusing agent to layers of the particulate build material. The fusing agent includes water and an electromagnetic radiation absorber. The electromagnetic radiation absorber absorbs radiation and converts the radiation energy to heat. In one example, the system can further include a radiant energy source positioned to expose the layers of particulate build material to radiation energy to selectively fuse the particulate build material in contact with the electromagnetic radiation absorber and thereby form a three-dimensional printed object. In another example, the system can include a hardware controller to generate a command to direct a build material applicator of the three-dimensional printing system to apply particulate build material layers to a powder bed of the three-dimensional printing system, direct the fusing agent applicator to iteratively and selectively apply the fusing agent to build material layers based on a three-dimensional object model, direct a radiant energy source of the three-dimensional printing system to expose the layer of powder bed material to radiation energy to selectively fuse the particulate build material in contact with the electromagnetic radiation absorber and thereby form a three-dimensional printed object, or a combination thereof.

It is noted that when discussing the methods and systems herein, these discussions can be considered applicable to one another whether or not they are explicitly discussed in the context of that example. Thus, for example, when discussing a fusing agent related to a method of making a three-dimensional printed object, such disclosure is also relevant to and directly supported in the context of systems for making three-dimensional printed objects, and vice versa.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Methods of Making Three-Dimensional Printed Objects

The methods described herein can be used to make three-dimensional printed articles from a polyolefin-based build material. Polyolefins include polymers made from alkene monomers, such as polyethylene and polypropylene. These polymers are useful in a very wide variety of applications. However, three-dimensional printing using these polymers can be challenging due to certain properties of the polymers. These properties can include a relatively low thermal conductivity and thermal diffusivity, a relatively high heat capacity, and multiple crystal phases.

Certain three-dimensional printing processes involve fusing layers of polymer powder to form solid layers of a three-dimensional printed object. In one process, a fusing agent can be applied onto a powder bed of polymer particles. The fusing agent can include an electromagnetic radiation absorber, which can be a material that absorbs radiant energy and converts the energy to heat. Radiant energy can be applied to the powder bed to heat and fuse the polymer particles on which the fusing agent was applied. Thus, the polymer particles can be heated to a temperature that is high enough to fuse the polymer particles together, which can be from 70° C. to 350° C. or higher, depending on the type of polymer being used as a build material. In certain examples of the three-dimensional printing processes describe herein, the fusing agent can be applied using jetting architecture such as an inkjet print head. Such a system can jet small droplets of the fusing agent at selected locations on the powder bed with a high resolution. This can allow for making high resolution, detailed three-dimensional printed objects.

This type of three-dimensional printing process can be particular suited for use with polymer build materials that can be melted and solidified quickly. The process can work best when areas of polymer powder that have the fusing agent applied can be heated to a higher temperature than the surrounding polymer powder, so that the polymer powder with the fusing agent applied melts while the surrounding powder remains solid. Highly crystalline polymers can be particularly well suited for this process. Additionally, polymers that can conduct and diffuse heat quickly can be useful because these types of polymers can be heated and cooled quickly. However, as mentioned above, many polyolefin polymers can have relatively low thermal conductivity and diffusivity. These polymers may also have multiple crystal phases instead of a clearly defined transition between crystalline and molten phases. Accordingly, these polymers can be difficult to use with the three-dimensional printing processes described above. It can be difficult to product three-dimensional printed object with good selectivity between the areas of the powder bed that are printed with the fusing agent and the surrounding areas that are not printed with fusing agent. The three-dimensional printed objects can also take a very long tie to cool, which slows the overall three-dimensional printing process.

The methods described herein can produce polyolefin-based three-dimensional printed objects more quickly, with better selectivity. In the methods described herein, the build material can be a composite particulate build material that is mostly made up of a polyolefin polymer with a small amount of metal or metal oxide nanoparticles added. The metal or metal oxide nanoparticles can increase the overall thermal conductivity and thermal diffusivity of the particulate build material. In particular, metal or metal oxide nanoparticles can be added to the particulate build material in two different ways. First, nanoparticles can be added to the polymer in a compounding stage, when the polymer is melted and mixed before being ground into particles. This can result in polymer particles that have multiple nanoparticles encapsulated within the polymer particles. These particles can then be dry blended with an additional amount of metal or metal oxide nanoparticles. These additional nanoparticles can help further increase the thermal conductivity and diffusivity of the polymer while also acting as a flow aid. The amounts of nanoparticles added can be relatively small. For example, the amount nanoparticles added during the compounding stage can be from about 0.10 wt % to about 5 wt % with respect to the total weight of the polymer. In another example, the amount of nanoparticles added by dry blending with the polymer powder can be from about 0.05 wt % to about 0.5 wt % with respect to the total weight of the particulate build material.

The addition of the metal or metal oxide nanoparticles in this way can make the particulate build material better suited for use in three-dimensional printing. In experiments detailed below, this particulate build material was compared with polyolefin powder that did not include the metal or metal oxide nanoparticles. The composite build material with the metal or metal oxide nanoparticles allowed for a wider processing window in three-dimensional printing. The processing window is a range of temperatures between the melting onset temperature of the build material and the crystallization onset temperature of the material. The composite build material provided a processing window that was 4° C. wider than the normal polyolefin powder. The three-dimensional printed objects made with the composite particulate build material also had better mechanical properties, such as elongation at break, tensile modulus, and tensile strength.

With this description in mind, FIG. 1 is a flowchart of an example method 100 of making a three-dimensional printed object. The method can include iteratively applying 110 individual particulate build material layers to a powder bed. The particulate build material can include polymer particles having a polyolefin and first nanoparticles compounded with the polyolefin such that the first nanoparticles are embedded within the polymer particles, and second nanoparticles dry blended with the polymer particles. The first nanoparticles and second nanoparticles can include metal or metal oxide. The first nanoparticles and the second nanoparticles can have a higher thermal conductivity than the polyolefin. In further detail, this method can further include, based on a three-dimensional object model, selectively applying 120 a fusing agent onto the individual particulate build material layers, wherein the fusing agent includes water and an electromagnetic radiation absorber. Furthermore, the method can include exposing 130 the powder bed to energy to selectively fuse the polymer particles in contact with the electromagnetic radiation absorber to form a fused polymer matrix at individual build material layers.

Figure 2:
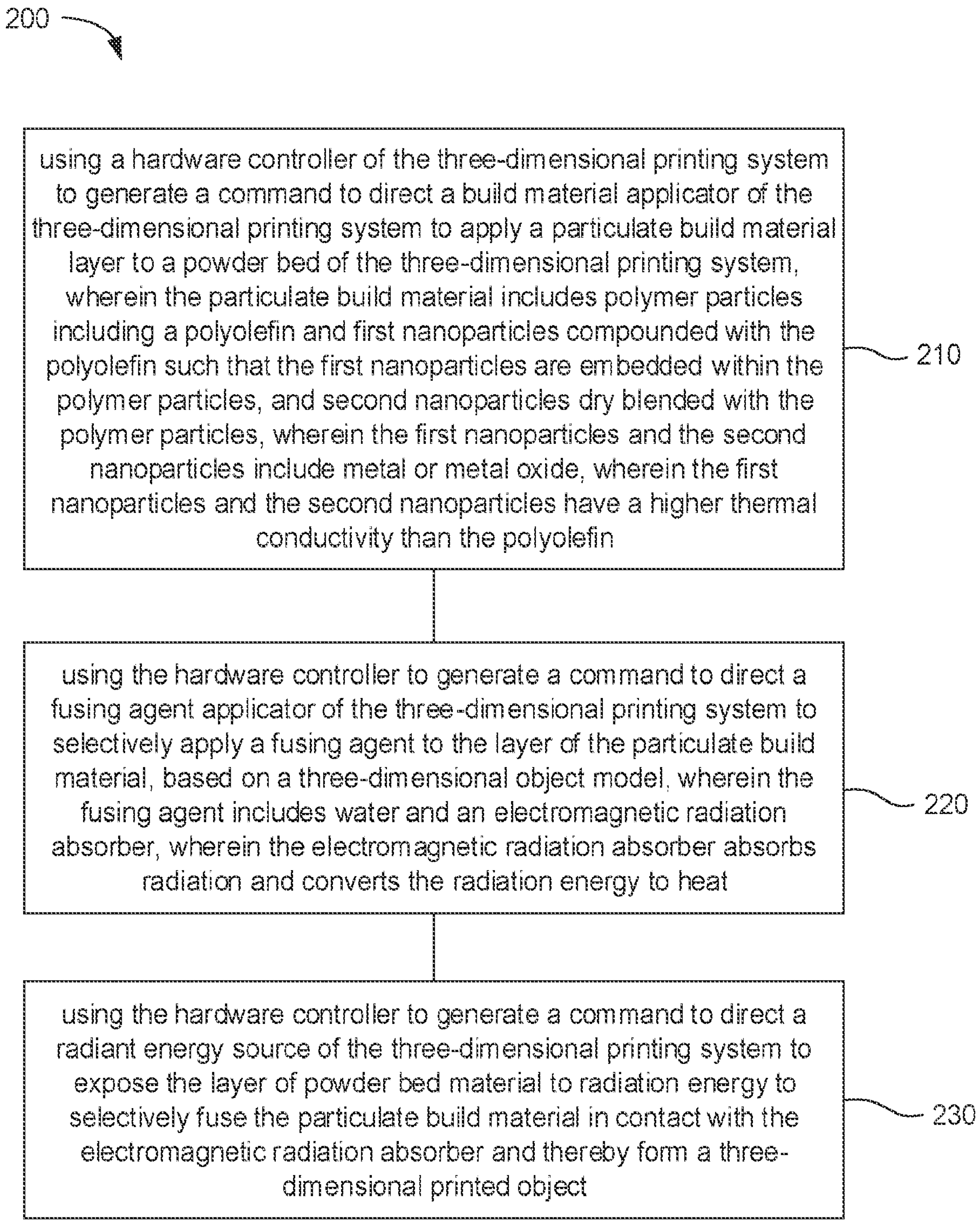
FIG. 2 is a flowchart illustrating another example method of making a three-dimensional printed object in accordance with examples of the present disclosure.

FIG. 2 is a flowchart of another specific example method 200 for making a three-dimensional printed object using a three-dimensional printing system. This particular method can include using 210 a hardware controller of the three-dimensional printing system to generate a command to direct a build material applicator of the three-dimensional printing system to apply a particulate build material layer to a powder bed of the three-dimensional printing system. The particulate build material can include polymer particles including a polyolefin and first nanoparticles compounded with the polyolefin such that the first nanoparticles are embedded within the polymer particles, and second nanoparticles dry blended with the polymer particles. The first nanoparticles and second nanoparticles can include metal or metal oxide, and the first nanoparticles and the second nanoparticles can have a higher thermal conductivity than the polyolefin. The method can also include using 220 the hardware controller to generate a command to direct a fusing agent applicator of the three-dimensional printing system to selectively apply a fusing agent to the layer of the particulate build material, based on a three-dimensional object model. The fusing agent can include water and an electromagnetic radiation absorber, wherein the electromagnetic radiation absorber absorbs radiation and converts the radiation energy to heat. The method can also include using 230 the hardware controller to generate a command to direct a radiant energy source of the three-dimensional printing system to expose the layer of powder bed material to radiation energy to selectively fuse the particulate build material in contact with the electromagnetic radiation absorber and thereby form a three-dimensional printed object.

These methods can be further illustrated by additional details that both methods may have in common. For example, the particulate build material and the fusing agent used in the methods are described in more detail below. Furthermore, in some examples, the methods of making a three-dimensional printed object can also include applying detailing agent to the powder bed. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

The fusing agent and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 40° C. of the melting or softening point. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The three-dimensional printed object can be formed by applying, such as by jetting, a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. The three-dimensional object model can define the three-dimensional shape of the article. In further examples, the three-dimensional object model may include both the three-dimensional shape of the article and also the three-dimensional shape of the portions of the powder bed where detailing agent is to be applied. In other examples, the article can be defined by a first three-dimensional object model and the area where the detailing agent is to be applied can be defined by a second three-dimensional object model. In still further examples, the areas where detailing agent is applied can be determined procedurally. Other information may also be included in the three-dimensional object model, such as structures to be formed of additional different materials or color data for printing the article with various colors at different locations on the article. The three-dimensional object model may also include features or materials specifically related to applying fluids, such as by jetting, on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying" individual particulate build material layers to a powder bed includes spreading particulate build material onto the empty build platform for the first layer. In other examples, a number of initial layers of particulate build material can be spread before the printing begins. These "blank" layers of build material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional article is printed. Thus, "applying" individual particulate build material layers to a powder bed also includes spreading layers of particulate build material over the loose particles and fused layers beneath the new layer of particulate build material.

In another specific example, a method of making a three-dimensional printed object can be performed using a three-dimensional printing system. The three-dimensional printing system can include the materials described herein, such as the fusing agent, detailing agent, and particulate build material. The system can also include appropriate hardware for forming the three-dimensional printed object from the materials, such as fluid applicators for applying fluid agents and a powder bed for holding layers of the particulate build material.

Figure 3A:
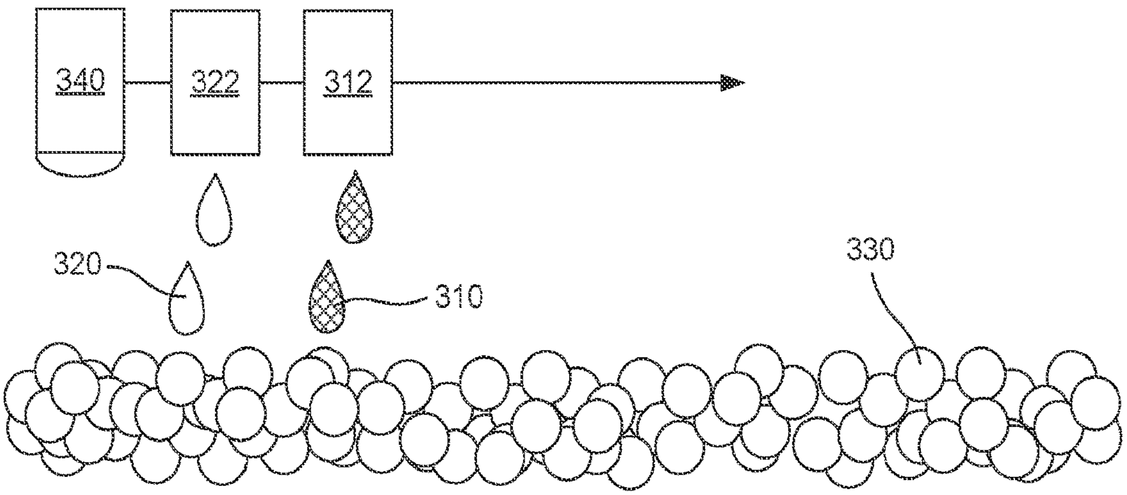
FIGS. 3A-3C show a schematic view of an example method of making a three-dimensional printed object in accordance with examples of the present disclosure.
Figure 3B:
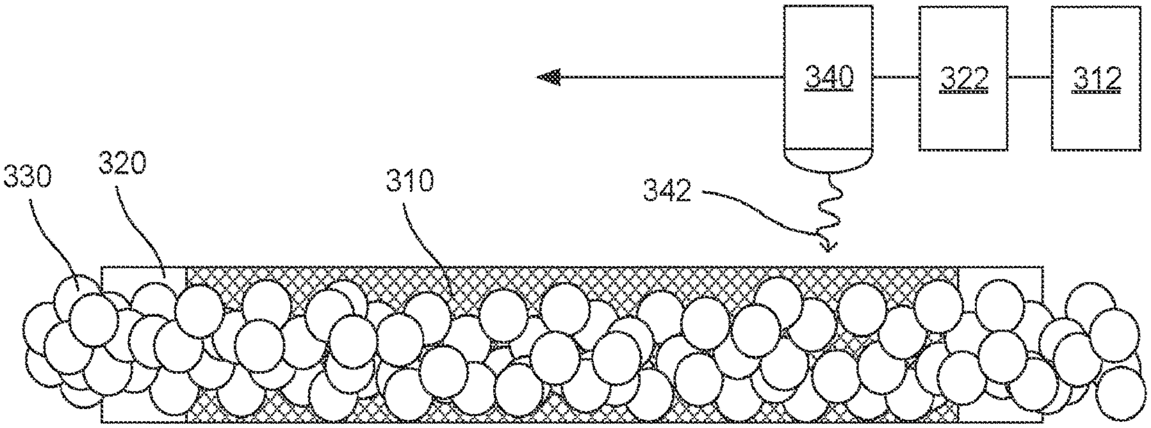
Figure 3C:
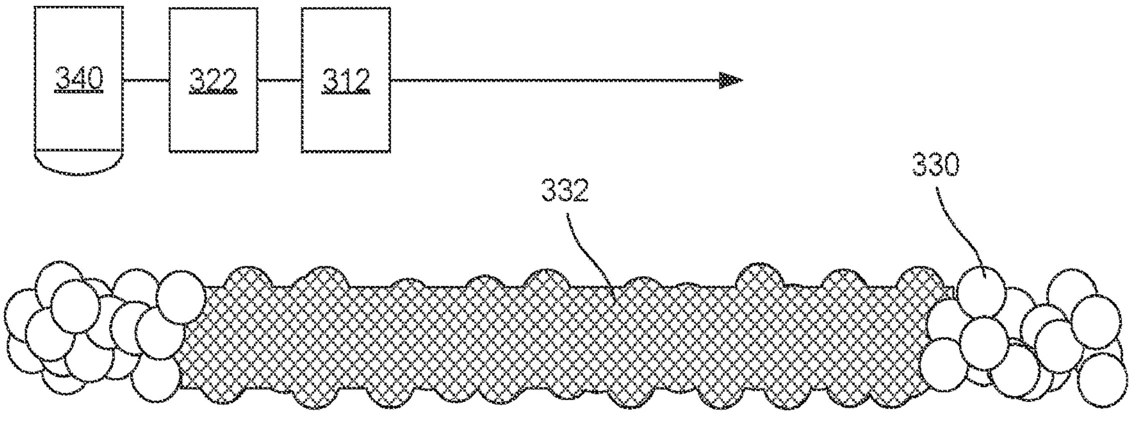

To further illustrate these various methods of making three-dimensional printed objects, FIGS. 3A-3C provide schematic illustrations of certain example methods. In FIG. 3A, a fusing agent 310 and a detailing agent 320 are jetted onto a layer of particulate build material 330. The fusing agent is jetted from a fusing agent ejector 312 and the detailing agent is jetted from a detailing agent ejector 322. These fluid ejectors can move across the layer of particulate build material to selectively jet fusing agent on areas that are to be fused. The detailing agent can be jetted on areas where it is desired to cool the particulate build material, such as around edges of the area where the fusing agent is jetted. A radiation source 340 can also move across the layer of powder bed material.

FIG. 3B shows the layer of particulate build material 330 after the fusing agent 310 has been jetted onto an area of the layer that is to be fused. Additionally, the detailing agent 320 has been jetted around the edges of the area where the fusing agent was jetted. In this figure, the radiation source 340 is shown emitting radiation 342 toward the layer of polymer particles. The fusing agent can include a radiation absorber that can absorb this radiation and convert the radiation energy to heat.

FIG. 3C shows the layer of particulate build material 330 with a fused portion 332 where the fusing agent was jetted. This portion has reached a sufficient temperature to fuse the polymer particles together to form a solid polymer matrix. The details shown in FIGS. 3A-3C are meant to supplement the methods described in FIGS. 1 and 2, and these details can be implemented to the extent consistent with the details of those methods, for example. Furthermore, the details shown in FIGS. 3A-3C can be considered in the context of the three-dimensional printing system described hereinafter as well.

Three-Dimensional Printing Systems

The present disclosure also describes three-dimensional printing systems that can be used to perform the methods described herein. In a particular example, a three-dimensional printing system can include a particulate build material and a fusing agent applicator. The particulate build material can include polymer particles that include a polyolefin and first nanoparticles compounded with the polyolefin such that the first nanoparticles are embedded within the polymer particles. The particulate build material can also include second nanoparticles that are dry blended with the polymer particles. The first nanoparticles and second nanoparticles can include metal or metal oxide. The first nanoparticles and the second nanoparticles can have a higher thermal conductivity that the polyolefin. The fusing agent applicator can be fluidly coupled or coupleable to a fusing agent, and the fusing agent applicator can be directable to iteratively apply the fusing agent to layers of the particulate build material. The fusing agent can include water and an electromagnetic radiation absorber. The electromagnetic radiation absorber can absorb radiation and convert the radiation energy to heat. In one example, the system can further include a radiant energy source positioned to expose the layers of particulate build material to radiation energy to selectively fuse the particulate build material in contact with the electromagnetic radiation absorber and thereby form a three-dimensional printed object. In another example, the system can include a hardware controller to generate a command to direct a build material applicator of the three-dimensional printing system to apply particulate build material layers to a powder bed of the three-dimensional printing system, direct the fusing agent applicator to iteratively and selectively apply the fusing agent to build material layers based on a three-dimensional object model, direct a radiant energy source of the three-dimensional printing system to expose the layer of powder bed material to radiation energy to selectively fuse the particulate build material in contact with the electromagnetic radiation absorber and thereby form a three-dimensional printed object, or a combination thereof.

Figure 4:
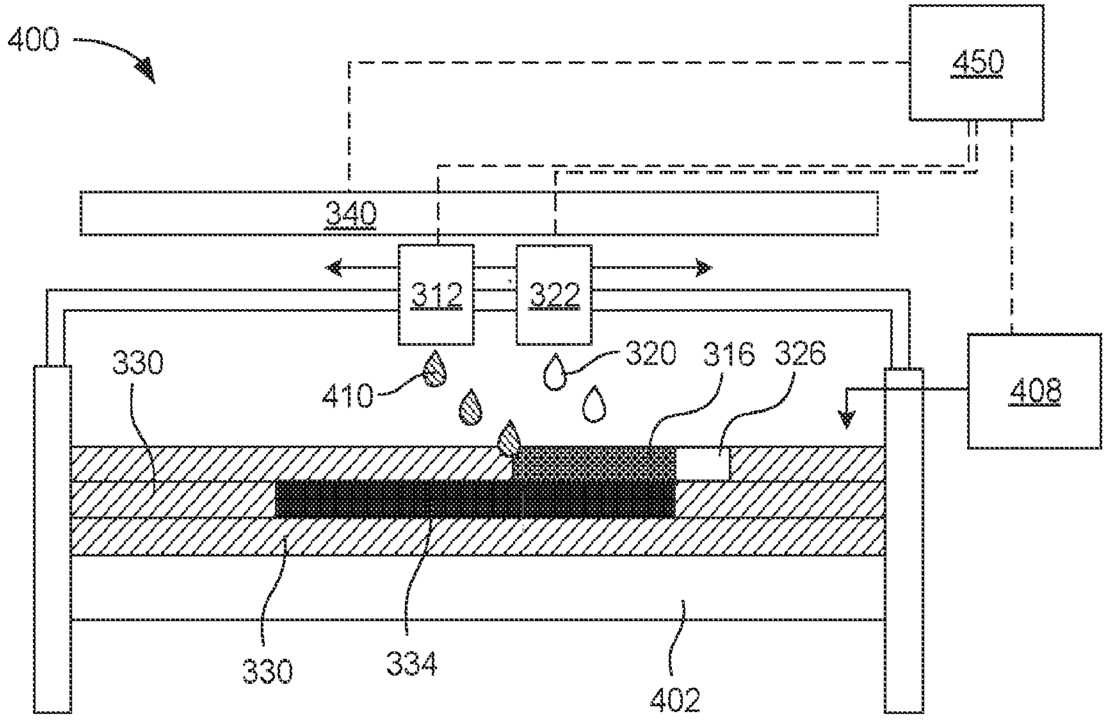
FIG. 4 is a schematic view of an example three-dimensional printing system in accordance with examples of the present disclosure.

FIG. 4 shows an example three-dimensional printing system 400 in accordance with the present disclosure. The system includes a build platform 402. Particulate build material 330 can be deposited onto the build platform by a build material applicator 408 where the particulate build material can be flattened or smoothed, such as by a mechanical roller or other flattening technique. This can form a flat layer of particulate build material. The fusing agent 310 can then be applied to the layer by a fusing agent applicator 312. A detailing agent 320 can also be applied by a detailing agent applicator 322. A first area 316 where the fusing agent is applied can correspond to a layer or slice of a three-dimensional object model. A second area 326 around the edges of the slice is printed with the detailing agent. The system also includes a radiant energy source 340 that can expose the powder bed to radiant energy to fuse the particulate build material where the fusing agent was applied. FIG. 4 shows a first layer of fused polymer 334 that has already formed, with an additional layer of particulate build material spread over the top, and the system is in the process of applying the fusing agent and detailing agent to the additional layer to form another layer of the three-dimensional printed object. In further detail, there can be a hardware controller 450 connected to various components of the system to generate commands to direct those components to perform their functions. For example, the hardware controller can generate a command to direct a build material applicator of the three-dimensional printing system to apply particulate build material layers to a powder bed of the three-dimensional printing system, direct the fusing agent applicator to iteratively and selectively apply the fusing agent to build material layers based on a three-dimensional object model, direct a radiant energy source of the three-dimensional printing system to expose the layer of powder bed material to radiation energy to selectively fuse the particulate build material in contact with the electromagnetic radiation absorber and thereby form a three-dimensional printed object, or a combination thereof.

Powder Bed Materials

As mentioned above, the particulate build material can include polymer particles and metal or metal oxide nanoparticles. A first set of metal or metal oxide nanoparticles can be compounded with the polyolefin so that the nanoparticles are embedded within the polymer particles. More specifically, the first set of nanoparticles can be added to the polymer and thoroughly mixed with the polymer during a compounding stage. In some examples, the polymer can be molten or softened in the compounding stage. Therefore, the first set of nanoparticles can be embedded in the polymer.

After compounding, the polymer with embedded nanoparticles can be made into particles. In some examples, this can be accomplished by mechanical grinding, cryogenic micronization, or another suitable process. The resulting particles can include the polymer with metal or metal oxide nanoparticles embedded within the individual particles.

A second set of metal or metal oxide nanoparticles can be mixed with the polymer particles by a process such as dry blending. Thus, the second set of nanoparticles can be mixed with the polymer particles, but not embedded within the polymer particles in the way that the first set of nanoparticles are. The second set of nanoparticles can help to increase the thermal conductivity and thermal diffusivity of the particulate build material. The second set of nanoparticles can also act as a flow aid to make the particulate build material more flowable.

The amount of metal or metal oxide nanoparticles in the particulate build material can be any amount that does not interfere with the three-dimensional printing process. In many examples, the amount of metal or metal oxide nanoparticles can be much less than the amount of polymer in the particulate build material. Additionally, the first nanoparticles (embedded in the polymer particles) and the second nanoparticles (dry blended with the polymer particles) can be included in the same amounts, or in different amounts. In some examples, the first nanoparticles can be included at a higher concentration than the second nanoparticles. In certain examples, the first nanoparticles can be included at a concentration from about 0.10 wt % to about 5 wt % with respect to the total weight of the polymer particles. In other examples, the second nanoparticles can be included at a concentration from about 0.05 wt % to about 3 wt % or from about 0.05 wt % to about 2 wt % with respect to the total weight of the polymer particles. In further examples, the second nanoparticles can be included at a concentration from about 0.05 wt % to about 0.5 wt % with respect to the total weight of the particulate build material. In certain examples, the second nanoparticles can be included at a concentration from about 0.05 wt % to about 0.3 wt % or from about 0.05 wt % to about 0.1 wt %.

The first nanoparticles and the second nanoparticles can have the same composition or different compositions. Materials that can be included in the nanoparticles include aluminum oxide, zinc oxide, silicon dioxide, copper oxide, titanium dioxide, silver, and combinations thereof. In certain examples, the nanoparticles can include aluminum oxide nanoparticles, silicon dioxide nanoparticles treated with aluminum oxide, zinc oxide nanoparticles, or combinations thereof. Commercially available metal oxide nanoparticles can include AEROXIDE® OX50, AEROXIDE® ALU C, AEROSIL® COK84, AEROSIL®200, SIPERNAT® 22S, SIPERNAT® D50 particles from Evonik Resources Efficiency GmbH (Germany), SPECTRAL®81, SPECTRAL®100, CAB-O-SIL® M5 from Cabot Corporation (U.S.A.).

In some examples, the metal or metal oxide nanoparticles can include primary particles that may be granulated to form larger granules made up of many primary particles. In some examples, these granules can be broken down into individual nanoparticles during compounding, dry blending, or other mixing processes. In certain examples, the nanoparticles can have an average primary particle size from about 7 nm to about 500 nm. In further examples, the average primary particle size can be from about 10 nm to about 300 nm or from about 10 nm to about 100 nm. The metal or metal oxide nanoparticles can often be much smaller than the polymer particles. In some examples, the polymer particles can have an average particle size from about 10 μm to about 140 μm. In other examples, the polymer particles can have an average particle size from about 15 μm to about 100 μm or from about 20 μm to about 100 μm.

The polymer particles can be made up mostly of a polyolefin polymer. Polyolefin polymers are polymers made by polymerizing alkene monomers. In some examples, the polyolefin can include polyethylene, polypropylene, polybutene-1, polymethylpentene, polyoctene, polyisoprene, polybutadiene or mixtures or copolymers thereof. For example, a polyolefin polymer can be formed by polymerizing multiple different alkene monomers. In other examples, the polymer can be made by combining a polyolefin with another type of polymer. In such examples, the polyolefin can be included in a greater amount and the second type of polymer can be included in a smaller amount. Other polymers that can be included in the polymer particles can include polyacrylate, polymethylmethacrylate, and others. In certain examples, these other polymers can be included in an amount from about 0.05 wt % to about 10 wt %, of from about 0.1 wt % to about 5 wt %, or from about 0.1 wt % to about 1 wt % of the polymer particles. The additional polymer can be combined with the polyolefin by mixing the polymers during compounding or by forming a copolymer in which a small amount of a non-alkene monomer is included to polymerize with the alkene monomers. For example, acrylate or methylmethacrylate monomers can be included to polymerize with propylene to make a polypropylene polymer that includes a small amount of acrylate or methylmethacrylate units. In various examples, the polyolefin can make up from about 90 wt % to about 99.7 wt % of the particulate build material.

In certain examples, the polymer particles can have a variety of shapes, such as substantially spherical particles or irregularly-shaped particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 200 μm thick, allowing the fused layers of the printed part to have roughly the same thickness. This can provide a resolution in the z-axis (i.e., depth) direction of about 20 μm to about 200 μm. The polymer powder can also have a sufficiently small particle size and sufficiently regular particle shape to provide about 20 μm to about 200 μm resolution along the x-axis and y-axis (i.e., the axes parallel to the top surface of the powder bed). For example, the polymer powder can have an average particle size from about 20 μm to about 200 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C.

The polymer particles can also in some cases be blended with a filler. The filler can include inorganic particles that may be in addition to the second nanoparticles described above. Such fillers can include alumina, silica, fibers, carbon nanotubes, or combinations thereof. When the polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of polymer to filler in the powder bed material can be from about 100:0.01 to about 1:2 or from about 100:0.1 to about 1:1.

Fusing Agents

The methods and systems described herein can include a fusing agent to be applied to the particulate build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can applying the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3.4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

In alternative examples, the radiation absorber can absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 μm layer of the fusing agent can absorb from 0% to about 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, applying the fusing agent can be by jetting the fusing agent onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol, 1,2-propanediol, and 1,5-pentanediol.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

In certain examples, the fusing agent can include a polar organic solvent. As used herein, "polar organic solvents" can include organic solvents made up of molecules that have a net dipole moment or in which portions of the molecule have a dipole moment, allowing the solvent to dissolve polar compounds. The polar organic solvent can be a polar protic solvent or a polar aprotic solvent. Examples of polar organic solvents that can be used can include diethylene glycol, triethylene glycol, tetraethylene glycol, C3 to C6 diols, 2-pyrrolidone, hydroxyethyl-2-pyrrolidone, 2-methyl-1,3 propanediol, poly(propylene glycol) with 1, 2, 3, or 4 propylene glycol units, glycerol, and others. In some examples, the polar organic solvent can be present in an amount from about 0.1 wt % to about 20 wt % with respect to the total weight of the fusing agent.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Detailing Agents

In further examples, the methods and systems can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description primarily describes the use of pigment colorants, the term "pigment" can be used to describe pigment colorants and other pigments such as organometallics, ferrites, ceramics, etc.

As used herein, D" when referring to a fluid agent that may be used, for example, refers to any technology that can be used to put or place the fluid, e.g., fusing agent, detailing agent, coloring agent, or the like on the polymeric build material or into a layer of polymeric build material for forming a three-dimensional object. For example, "applying" may refer to a variety of dispensing technologies, including "jetting," "ejecting," "dropping," "spraying," or the like.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Particulate Build Material with Dry Blended Metal Oxide

A sample particulate build material was prepared by dry blending polymer particles that included polypropylene with aluminum oxide nanoparticles and silicon dioxide microparticles. The aluminum oxide nanoparticles were AEROXIDE® Alu C nanoparticles from Evonik Resources Efficiency GmbH (Germany). The concentration of the aluminum oxide nanoparticles was 0.10 wt % with respect to the total weight of the particulate build material. The silicone dioxide microparticles included AEROSIL® 200 at 0.05 wt % and 0.4 wt % SIPERNAT 22S from Evonik Resources Efficiency GmbH (Germany).This particulate build material did not include metal or metal oxide nanoparticles compounded within the polypropylene particles themselves. A series of test objects were printed using a test three-dimensional printing system that included fluid applicators forjetting a fusing agent and a detailing agent onto the particulate build material. After printing, the test objects were analyzed for mechanical properties including elongation (strain) at yield, elongation (strain) at break, flexural modulus, and Charpy Notched Impact. The elongation at yield and elongation at break can be measured according to ASTM D658 or ISO 527, 2 using an INSTRON® tensiometer (Instron, U.S.A.) or ZWICK® tensiometer (Zwick GmbH, Germany). Flexural modulus is also measurable, such as in accordance with ASTM D790 or ISO 178 using a similar tensiometer. Charpy Notched Impact is measurable according to ISO 179 D. Notably, ASTM and ISO testing protocols herein are based on the most recent publication as of the date of fling of the present application. The test results are shown in Table 1. Three test objects were measured for these properties, and the values in the table are the average of the three measurements.

TABLE 1

| Property | Polypropylene | Polypropylene w/dry blended $Al_2O_3$ and $SiO_2$ |
|---|---|---|
| Elongation at Yield | 8.7% | 10.1% |
| Elongation at Break | 15.3% | 22% |
| Flexural Modulus | 1530 MPa | 1695 MPa |
| Charpy Notched Impact | 2.4 $kJ/m^2$ | 3.3 $kJ/m^2$ |

These results show a slight increase in elongation at yield, a slight increase in elongation at break, a slight increase in flexural modulus, and a slight increase in Charpy Notched Impact.

Example 2—Particulate Build Material with Compounded Metal Oxide and Dry Blended Metal Oxide Another sample particulate build material was prepared by adding aluminum oxide nanoparticles to a polypropylene-based polymer during compounding. These aluminum oxide nanoparticles were AEROXIDE® Alu C from Evonik Resources Efficiency GmbH (Germany), at 0.05 wt % to 0.15 wt % with respect to the total weight of the polymer/nanoparticle mixture. The aluminum oxide nanoparticles were compounded with the polymer until well-mixed. The polymer was then ground into particles by a cryogenic micronization process. The resulting polymer particles had aluminum oxide nanoparticles embedded within. The polymer particles were then dry blended with additional aluminum oxide as in Example 1. This particulate build material was used to make a series of test three-dimensional printed objects. After printing, the test objects were analyzed for mechanical properties including elongation (strain) at yield, elongation (strain) at break, tensile modulus, tensile strength, Izod Notched Impact, and Charpy Notched Impact. The elongation at yield, elongation at break, tensile modulus, and tensile strength can be measured according to ASTM D658 or ISO 527, 2 using an INSTRON® tensiometer (Instron, U.S.A.) or ZWICK® tensiometer (Zwick GmbH, Germany). Izod Notched Impact can be measured according to ISO 180, and Charpy Notched Impact can be measured according to ISO 179 D. The Izod and Charpy Notched Impact methods are similar, with the difference being that with the Izod Impact Test, the specimen is positioned vertically, and with the Charpy Notched Impact Test, the specimen is positioned horizontally. The test results are shown in Table 2. Again, three test objects were measured for these properties and the measurements were averaged.

TABLE 2

| Property | Polypropylene | Polypropylene w/ compounded $Al_2O_3$ and dry blended $Al_2O_3$, $SiO_2$ |
|---|---|---|
| Elongation at Yield | 9.14% | 8.99% |
| Elongation at Break | 15% | 22.3% |
| Tensile Modulus | 1750 MPa | 2009 MPa |
| Tensile Strength | 29.3 MPa | 32.6 MPa |
| Izod Notched Impact 10 mm | 2.39 $kJ/m^2$ | 2.88 |
| Charpy Notched Impact | 2.70 $kJ/m^2$ | 2.83 $kJ/m^2$ |

These results also show an increase in tensile modulus, tensile strength, elongation at break, Izod Notched Impact 10 mm, and Charpy Notched Impact. The elongation at yield decreased slightly.

The test objects printed with the particulate build material also had a different microstructure compared to the original polypropylene powder. The material with the aluminum oxide had more of the alpha crystal phase (monoclinic unit cell), less of the beta phase (trigonal unit cell) and less of the gamma phase (orthorhombic unit cell). The test objects also had a higher density than the objects printed with original polypropylene powder. Additionally, more thermal bleed was observed when the new particulate material was used with the same printing parameters as used for the original polypropylene powder. This indicates that the particulate build material with the aluminum oxide had a higher thermal conductivity.

What is claimed is:

1. A method of making a three-dimensional printed object, the method comprising:

iteratively applying individual layers of a particulate build material to a powder bed, wherein the particulate build material includes:

polymer particles including a polyolefin and first nanoparticles compounded with the polyolefin such that the first nanoparticles are embedded within the polymer particles; and second nanoparticles dry blended with the polymer particles, wherein the first nanoparticles and the second nanoparticles comprise metal or metal oxide, and wherein the first nanoparticles and the second nanoparticles have a higher thermal conductivity than the polyolefin;

based on a three-dimensional object model, selectively applying a fusing agent onto the individual particulate build material layers, wherein the fusing agent includes water and an electromagnetic radiation absorber; and exposing the powder bed to energy to selectively fuse the polymer particles in contact with the electromagnetic radiation absorber to form a fused polymer matrix at individual layers.

2. The method of claim 1, wherein the first nanoparticles are present in the polymer particles at a concentration of from about 0.25 wt % to about 5 wt %, with respect to a total weight of the polymer particles.

3. The method of claim 1, wherein the second nanoparticles are present in the particulate build material at a concentration of from about 0.05 wt % to about 0.5 wt %, with respect to a total weight of the particulate build material.

4. The method of claim 1, wherein the polyolefin is selected from the group consisting of polyethylene, polypropylene, polybutene-1, polymethylpentene, polyoctene, polyisoprene, polybutadiene, and a copolymer thereof.

5. The method of claim 1, wherein the first nanoparticles and the second nanoparticles are independently selected from the group consisting of aluminum oxide, zinc oxide, silicon dioxide, copper oxide, titanium dioxide, silver, and a combination thereof.

6. The method of claim 1, wherein the first nanoparticles and the second nanoparticles are the same compound.

7. The method of claim 1, wherein the polymer particles have an average particle size of from about 10 μm to about 140 μm, and wherein the first nanoparticles have an average particle size of from about 7 nm to about 500 nm.

8. The method of claim 1, wherein the radiation absorber is selected from the group consisting of carbon black, a near-infrared absorbing dye, a near-infrared absorbing pigment, a tungsten bronze, a molybdenum bronze, metal nanoparticles, a metal dithiolene complex, a conjugated polymer, and a combination thereof.

9. The method of claim 1, further including selectively applying a detailing agent onto an area of the individual layers to reduce a temperature of the particulate build material onto which the detailing agent is jetted.

10. A method of printing a three-dimensional printed object using a three-dimensional printing system, the method comprising:

using a hardware controller of the three-dimensional printing system to generate a command to direct a build material applicator of the three-dimensional printing system to apply a layer of particulate build material to a powder bed of the three-dimensional printing system, wherein the particulate build material includes:

polymer particles including a polyolefin and first nanoparticles compounded with the polyolefin such that the first nanoparticles are embedded within the polymer particles; and second nanoparticles dry blended with the polymer particles, wherein the first nanoparticles and the second nanoparticles comprise metal or metal oxide, and wherein the first nanoparticles and the second nanoparticles have a higher thermal conductivity than the polyolefin;

using the hardware controller to generate a command to direct a fusing agent applicator of the three-dimensional printing system to selectively apply a fusing agent to the layer of the particulate build material based on a three-dimensional object model, wherein the fusing agent includes water and an electromagnetic radiation absorber, wherein the electromagnetic radiation absorber absorbs radiation and converts the radiation energy to heat; and using the hardware controller to generate a command to direct a radiant energy source of the three-dimensional printing system to expose the layer of particulate build material to radiation energy to selectively fuse the particulate build material in contact with the electromagnetic radiation absorber and form a three-dimensional printed object.

11. The method of claim 10, wherein:

the first nanoparticles are present in the polymer particles at a concentration of from about 0.25 wt % to about 5 wt %, with respect to a total weight of the polymer particles;

the second nanoparticles are included in the particulate build material at a concentration of from about 0.05 wt % to about 0.5 wt %, with respect to a total weight of the particulate build material;

the polyolefin is selected from the group consisting of polyethylene, polypropylene, polybutene-1, polymethylpentene, polyoctene, polyisoprene, polybutadiene, and a copolymer thereof; and the first nanoparticles and the second nanoparticles are independently selected from the group consisting of aluminum oxide, zinc oxide, silicon dioxide, copper oxide, titanium dioxide, silver, and a combination thereof.

12. The method of claim 10, further comprising using the hardware controller to generate a command to direct a detailing agent applicator of the three-dimensional printing system to apply a detailing agent to the layer of particulate build material to cool the particulate build material.

* * * * *